Jan. 20, 1925.

C. R. WASSELL 1,523,795

BRAKE EQUALIZER

Filed Feb. 6, 1924   2 Sheets-Sheet 1

Inventor
Clifford R. Wassell

Attorneys

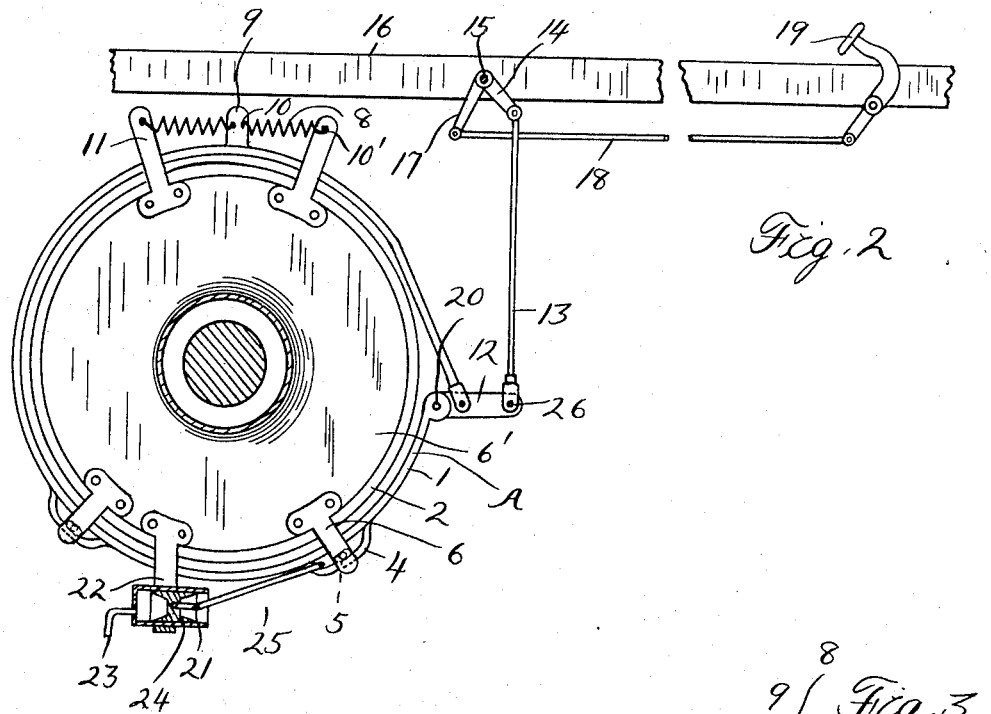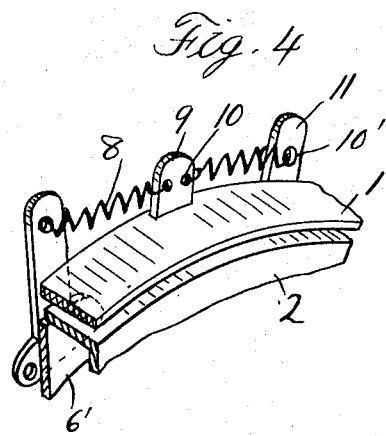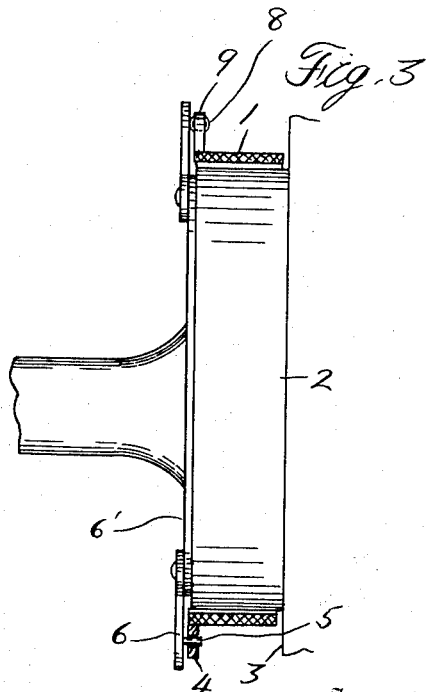

Patented Jan. 20, 1925.

1,523,795

UNITED STATES PATENT OFFICE.

CLIFFORD R. WASSELL, OF ELGIN, ILLINOIS, ASSIGNOR, BY DIRECT AND MESNE ASSIGNMENTS, TO AUGUSTUS J. MAYNARD, TRUSTEE, OF DETROIT, MICHIGAN.

BRAKE EQUALIZER.

Application filed February 6, 1924. Serial No. 690,976.

*To all whom it may concern:*

Be it known that I, CLIFFORD R. WASSELL, a citizen of the United States of America, residing at Elgin, in the county of Kane and State of Illinois, have invented certain new and useful Improvements in Brake Equalizers, of which the following is a specification, reference being had therein to the accompanying drawings.

This invention relates generally to vehicle brakes and refers more particularly to equalizing mechanism therefor.

One of the essential objects of the invention is to provide a simple and efficient mechanism in which a liquid may be placed under pressure by the braking element of one brake to cause the braking elements of other brakes to be applied so that the resultant braking action of all of the brakes will be equalized.

With the above and other objects in view, the invention consists of certain novel features of construction, combinations and arrangements of parts as will be more fully described and particularly pointed out in the appended claims.

In the accompanying drawings:—

Figure 1 is a top plan view of a portion of a vehicle and showing my invention applied thereto;

Figure 3 is an end view of the drum showing parts in section;

Figure 4 is a detail perspective view of the positioning means for the brake band;

Figure 2:
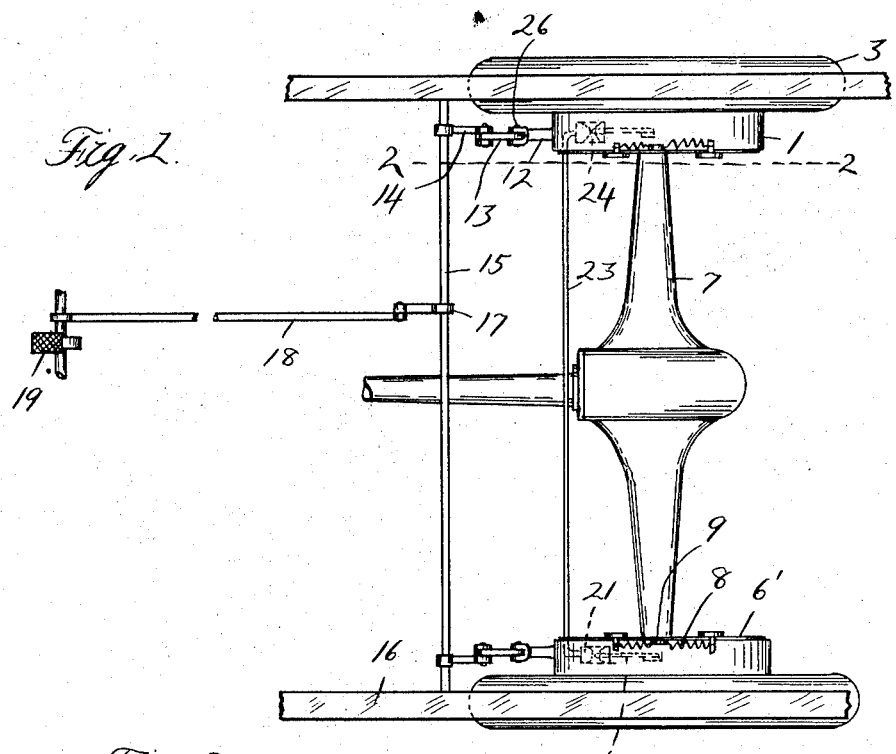
Figure 2 is a sectional view taken on line 2—2 of Figure 1.

Referring now to the drawings in which like characters of reference designate corresponding parts throughout the several views, the numeral 1 designates a pair of brake bands surrounding suitable brake drums 2 secured to the rear wheels 3 of a vehicle. The bands are preferably provided at spaced points with outwardly extending elongated loops 4 that receive pins 5 projecting from arms 6 that are secured to flanges 6' on the rear axle housing 7 of the vehicle. The bands 1 are normally held in inoperative position by means of coil springs 8 that engage opposite sides of a lug 9 on each brake band. The adjacent ends of the springs preferably engage sockets 10 in the lug 9 while the remote ends of the springs are located in sockets 10' in arms 11 secured to the rear flange 6'.

The ends of the bands 1 are preferably pivotally connected at spaced points to levers 12 which may be actuated by any suitable means for contracting the bands upon the drums to secure the braking effect. As shown, the free ends of the levers 12 are pivotally connected to rods 13 that are in turn pivotally connected to rock arms 14 non-rotatively secured to a rock shaft 15 extending transversely of the frame 16 of the vehicle. For rocking the shaft 15 there is a rock arm 17 non-rotatively connected to the shaft 15 at a point between the arms 14. The rock arm 17 is pivotally connected to a rod 18 that is adapted to be moved longitudinally by a suitable foot-operated pedal 19 pivoted on a side bar of the frame 16 of the vehicle. Thus, when the pedal 19 is actuated to apply the brakes the rods 13 will be moved downwardly and will cause the levers 12 to swing about the innermost pivots 20 against the tension of the springs 8 so that the bands 1 will be contracted upon the drums 2.

In order that a liquid may be placed under pressure by the brake band of one brake to cause the brake band of the other brake to be applied so that the braking action of both of the brakes will be equalized, I preferably provide cylinders 21 that are supported by arms 22 from the flange 6' and that are connected by a suitable pipe or tube 23 extending transversely of the vehicle. A suitable piston 24 is slidably mounted in each of the cylinders 21 and is connected by a rod 25 to one of the loops 4 upon each of the brake bands.

In use, the wheels 3 rotate in the direction of the arrow shown in Figure 2, consequently, when the pedal 19 is operated to set the brakes one of the bands 1 will in all probability engage its brake drum before the other brake band engages its brake drum. As soon as the first band comes in contact with its drum the lower portion of the band indicated by the letter A will have a tendency to move around the drum and at the same time move away from the drum. This action of the band will cause the rod 25 connected thereto to move the adjacent piston inwardly of its cylinder and thereby cause the liquid in that cylinder to be displaced into the tube 23 and to exert a sufficient pressure against the other piston in the cylinder at the other side of the vehicle to move outwardly the rod 25 connected thereto and thereby contract the other brake band upon its drum. In view of the fact the pressure of the operator's foot upon the pedal will be maintained while the piston operates, it will be readily apparent that when either piston is moved outwardly to set one of the brakes, the outermost pivots 26 will become the fulcrums for the levers 12 whereby the bands 1 will be contracted upon the drums.

Figure 5:
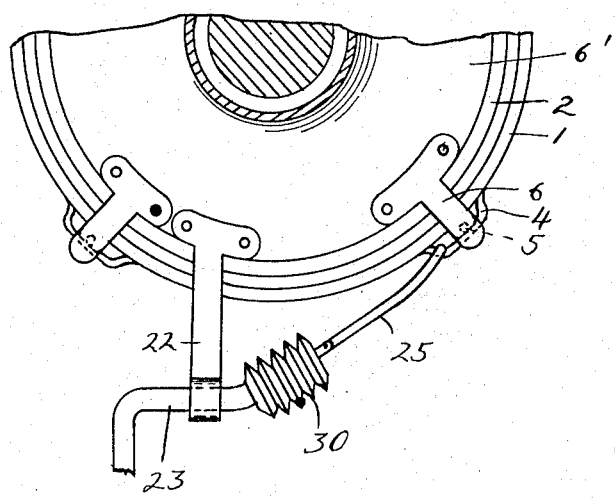
Figure 5 is a sectional elevation of a slightly modified form of construction.

In Figure 5 I have shown a slight modification in which a pair of expansible chambers 30 are substituted for the cylinders 21 and pistons 24. With this construction, the chambers 30 are connected at one end to the rods 25 and are connected at their other ends to the pipe 23. Thus, when one rod 25 collapses one of the chambers 30, the pressure exerted by the liquid displaced from that chamber into the pipe 13 will expand the other chamber and cause the rod 25 connected to the last-mentioned chamber to contract the other brake band upon its drum.

While I have shown and described my invention in connection with two wheel brakes, it is readily apparent that the invention may be used with any number of brakes in excess of two, consequently, I desire to have it understood that I do not limit myself to what is herein shown and described and that such changes may be resorted to when desired as fall within the scope of what is claimed.

What I claim as my invention is:—

1. The combination with a plurality of brakes having movable braking elements, and means for applying a braking pressure to one of said elements, of liquid pressure operated means adapted to be actuated by said element to cause the braking elements of the other brakes to be applied so that the resultant braking effect of all of the brakes will be equalized.

2. The combination with a plurality of brakes having movable braking elements, and means for applying a braking pressure to all of said braking elements simultaneously, of liquid pressure operated means adapted to be actuated by one braking element for actuating the braking elements of the other brakes so that the resultant braking effect of all of the brakes will be equalized.

3. The combination with a plurality of brakes having rotatable drums, and brake bands engageable with said drums, of means for moving said bands into braking engagement with said drums, and liquid pressure operated means adapted to be actuated by one brake band for actuating the brake bands of the other brakes so that the resulting braking effect of all of the brakes will be equalized.

4. The combination with a plurality of brakes having rotatable drums, and brake bands engageable with said drums, of means for contracting said bands upon said drums, and liquid pressure operated means adapted to be actuated by one brake band for actuating the brake bands of the other brakes so that the resultant braking effect of all of the brakes will be equalized.

5. The combination with a plurality of brakes having rotatable drums, and brake bands engageable with said drums, of levers pivotally connected to the ends of said brake bands, means for actuating said levers to move said bands into braking engagement with said drums, and means adapted to be actuated by one brake band for actuating the brake bands of the other brakes so that the resultant braking effect of all of the brakes will be equalized.

6. The combination with a plurality of brakes having rotatable drums, and brake bands engageable with said drums, of liquid pressure operated means for equalizing the resultant braking effect of said bands, and actuating members connecting said brake bands to said liquid pressure operated means.

In testimony whereof I affix my signature.

CLIFFORD R. WASSELL.